US012662586B2

(12) United States Patent
Hart et al.

(10) Patent No.: US 12,662,586 B2
(45) Date of Patent: Jun. 23, 2026

(54) COMPATIBILIZATION OF IMMISCIBLE POLYMERS USING CARBON NANOTUBES

(71) Applicant: Nanocomp Technologies, Inc., The Woodlands, TX (US)

(72) Inventors: Ashley Hart, Merimack, NH (US); Eitan Zeira, Merimack, NH (US); Geoff Rollins, Merimack, NH (US)

(73) Assignee: Huntsman Nanocomp LLC, The Woodlands, TX (US)

( * ) Notice: Subject to any disclaimer, the term of this patent is extended or adjusted under 35 U.S.C. 154(b) by 559 days.

(21) Appl. No.: 17/925,454

(22) PCT Filed: May 17, 2021

(86) PCT No.: PCT/US2021/032700
§ 371 (c)(1),
(2) Date: Nov. 15, 2022

(87) PCT Pub. No.: WO2021/236490
PCT Pub. Date: Nov. 25, 2021

(65) Prior Publication Data
US 2023/0183448 A1     Jun. 15, 2023

Related U.S. Application Data

(60) Provisional application No. 63/026,390, filed on May 18, 2020.

(51) Int. Cl.
*H01B 1/24*      (2006.01)
*C08J 3/20*      (2006.01)
(Continued)

(52) U.S. Cl.
CPC ............... *C08K 3/041* (2017.05); *C08J 3/201* (2013.01); *C08J 3/226* (2013.01); *C08K 9/00* (2013.01);
(Continued)

(58) Field of Classification Search
CPC .......... H01B 1/00; H01B 1/24; C01B 32/156; C01B 32/158; C01B 32/168; C08K 3/041
See application file for complete search history.

(56) References Cited

U.S. PATENT DOCUMENTS 6,746,627 B2 *   6/2004   Niu ......................... H01B 1/24
                                                                264/105
7,022,776 B2     4/2006   Bastiaens et al.
(Continued)

FOREIGN PATENT DOCUMENTS

CN          102336942 A      2/2012
EP            2824069 A1     1/2015
(Continued)

OTHER PUBLICATIONS

Goldel et al "The kinetics of CNT transfer between immiscible blend phases during melt mixing", Polymer 53 (2012) 411-421.*
(Continued)

*Primary Examiner* — Mark Kopec
(74) *Attorney, Agent, or Firm* — Huntsman Nanocomp LLC

(57) ABSTRACT

The present disclosure provides a polymer blend that includes at least two polymers which are immiscible to one another and a carbon nanotube pulp comprising entangled carbon nanotubes as a compatibilizing agent and to a method of preparing the same.

11 Claims, 3 Drawing Sheets

50/50 3%

90/10 3%

80/20 3%

(51) Int. Cl.
    *C08J 3/22*            (2006.01)
    *C08K 3/04*           (2006.01)
    *C08K 9/00*           (2006.01)
    *C08L 23/06*         (2006.01)
    *C08L 67/02*         (2006.01)

(52) U.S. Cl.
    CPC .............. *C08L 23/06* (2013.01); *C08L 67/02* (2013.01); *H01B 1/24* (2013.01); *C08J 2323/06* (2013.01); *C08J 2367/02* (2013.01); *C08J 2423/06* (2013.01); *C08J 2467/02* (2013.01); *C08K 2201/001* (2013.01); *C08K 2201/003* (2013.01); *C08K 2201/004* (2013.01); *C08K 2201/006* (2013.01); *C08K 2201/011* (2013.01); *C08K 2201/016* (2013.01); *C08L 2203/30* (2013.01); *C08L 2207/066* (2013.01); *C08L 2310/00* (2013.01)

(56) References Cited

U.S. PATENT DOCUMENTS

| | | | |
|---|---|---|---|
| 7,993,620 | B2 | 8/2011 | Lashmore et al. |
| 8,722,171 | B2 | 5/2014 | Lashmore et al. |
| 8,999,285 | B2 | 4/2015 | Lashmore et al. |
| 2007/0199729 | A1 | 8/2007 | Siegel et al. |
| 2011/0204296 | A1 | 8/2011 | Carsten et al. |
| 2013/0030117 | A1* | 1/2013 | Song ........................ C08K 7/24 |
| | | | 977/750 |
| 2013/0197122 | A1 | 8/2013 | Gauchet et al. |
| 2015/0298974 | A1 | 10/2015 | Kim et al. |
| 2018/0126350 | A1 | 5/2018 | Kang et al. |
| 2018/0141817 | A1* | 5/2018 | Wehnert ..................... C08J 3/05 |

FOREIGN PATENT DOCUMENTS

| | | | |
|---|---|---|---|
| EP | 3268425 | A1 | 1/2018 |
| JP | 2005500409 | A * | 1/2005 ............. B82Y 30/00 |
| WO | 2016142848 | A1 | 9/2016 |
| WO | 2018185627 | A1 | 10/2018 |

OTHER PUBLICATIONS

Tao et al "Influence of Multiwall Carbon Nanotubes Trapped at the Interface of an Immiscible Polymer Blend on Interfacial Tension", Macromol. Chem. Phys. 2013, 214, 350-360.*

Roman et al "On the phase affinity of multi-walled carbon nanotubes in PMMA:LDPE immiscible polymer blends", Polymer 118 (2017) 1-11.*

Zhao et al "Enhanced Interfacial Adhesion by Reactive Carbon Nanotubes: New Route to High-Performance Immiscible Polymer Blend Nanocomposites with Simultaneously Enhanced Toughness, Tensile Strength, and Electrical Conductivity", ACS Appl. Mater. Interfaces 2018, 10, 8411-8416.*

Yang et al "Carbon nanotubes toughened immiscible polymer blends", Composites Communications 7 (2018) 51-64.*

"Carbon Nanotube Chopped Fiber for Enhanced Properties in Additive Manufacturing", Menchhofer et al., Oak Ridge National Laboratory; CRADA Final Report NFE-15-05687 (Jun. 6, 2016).*

Khan et al "Functionalized carbon nanotubes mixed matrix membranes of polymers of intrinsic microporosity for gas separation", Nanoscale Research Letters 2012, 7:504 http://www.nanoscalereslett.com/content/7/1/504.*

Chen et al. (2013). 'Improving interfacial adhesion between immiscible polymers by carbon nanotubes'. Polymer. 54. 464-471. Doi: 10.1016/j.polymer.2012.11.042. Abstract.

Siegal et al. 'Planarized un-entangled carbon nanotube arrays.'. United States: N. p. 2013. Web. https;//www.ostl.gov/servlets/purl/1117386. Abstract.

Extended Search Report issued in corresponding European Application No. 21808683.3 conducted Jun. 24, 2024.

V.M. Sutyagin, L.I. Bondaletova; Chemistry and Physics of Polymers; Chapter 13 Phase and Physical States of Polymers cited in RU OA for corresponding RU Application No. RU2022133103.

* cited by examiner

80/20 3%

90/10 3%

50/50 3%

COMPATIBILIZATION OF IMMISCIBLE POLYMERS USING CARBON NANOTUBES

CROSS-REFERENCE TO RELATED APPLICATIONS

This application claims the benefit of and priority to U.S. Provisional Application No. 63/026,390, filed May 18, 2020, which is hereby incorporated herein by reference in its entirety.

STATEMENT REGARDING FEDERALLY SPONSORED RESEARCH OR DEVELOPMENT

This invention was made with Government support under DE-AR0001017 awarded by DOE, Office of ARPA-E. The Government has certain rights in this invention.

FIELD

The present disclosure generally relates to a polymer blend and more specifically to a polymer blend that includes polymers which are immiscible when mixed and a carbon nanotube pulp as a compatibilizing agent, and to a novel method of preparing the same.

BACKGROUND

Multiphase polymer blends are of major economic importance in the polymer industry. The blending of different polymers enables the production of new polymeric materials having an attractive balance of physical and mechanical properties. For example, to enhance the impact strength of a brittle polymer such as polystyrene, small amounts of a rubbery polymer like polybutadiene may be added to create a polymer blend which is tougher and more ductile than unblended polystyrene. However, the development of useful polymer blends is difficult because of their inherent immiscibility which results in coarsely phase separated polymer mixtures in which the interfaces between components are compositionally sharp and mechanically weak.

Numerous techniques for improving the properties of immiscible polymer blends have been developed. Perhaps the most effective and widely studied of these techniques has been the use of compatibilizing agents to modify the phase separate morphology of the polymer blends. Compatibilizing agents are generally block copolymers, graft copolymers, random copolymers and homopolymer materials that have a degree of miscibility in each of the phase separated domains and can therefore function as a bridge between them. This bridging function reduces the interfacial energy between the domains and enables them to be more finely dispersed or intermixed. This in turn improves the properties of the resulting blend.

Although the use of conventional compatibilizing agents can promote better intermixing between immiscible polymers to afford blends that exhibit improved properties, each conventional compatibilizing agent is typically blend specific and not suitable for use with other polymer blends. Furthermore, the process of developing an effective compatibilizing agent for a particular polymer blend can be quite difficult. Hence, there exists a need to develop new compatibilizing agents which can be added to a wide variety of immiscible polymers to produce stable, homogeneous and highly efficient polymer blends which possess good mechanical properties.

SUMMARY

The present disclosure is generally directed to a polymer blend comprising at least two immiscible polymers and a carbon nanotube pulp comprising entangled carbon nanotube bundles characterized as having one or more of the following characteristics: (i) a diameter of between about 10-100 nm, (ii) a length of between about 0.1-10 mm, (iii) a density of between about 0.7-1.9 g/cm$^3$, (iv) an aspect ratio of at least about 250,000, (v) a strain to failure of between about 1.8-7%, and (vi) a surface area from about 100-300 m$^2$/g.

The present disclosure also provides a method of forming the polymer blend by dispersing, such as by melt mixing, the first immiscible polymer with a first portion of the carbon nanotube pulp to form a first blend, then dispersing, such as by melt mixing, the second immiscible polymer with a second portion of the carbon nanotube pulp to form a second blend, and dispersing, such as by melt mixing, the first blend into the second blend to form the polymer blend.

DETAILED DESCRIPTION

Figure 1:
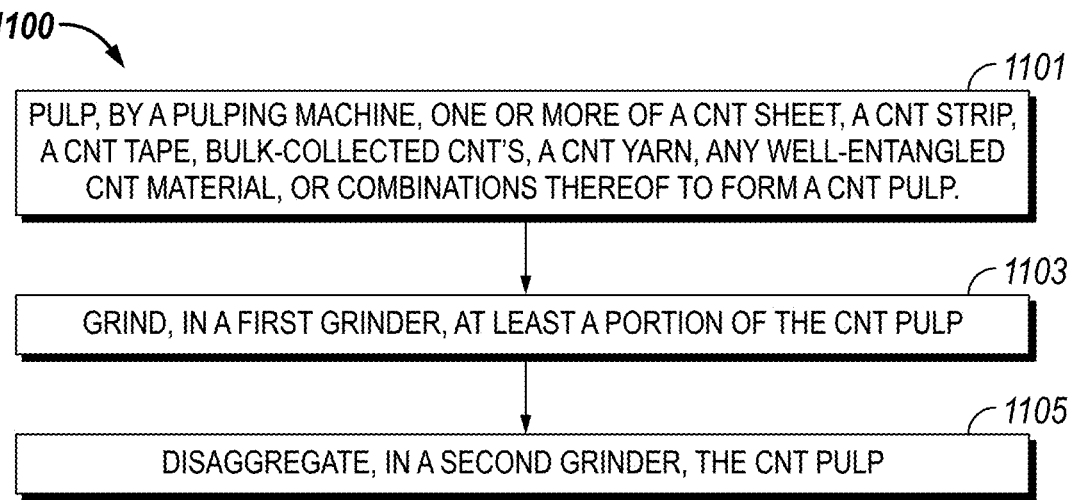
FIG. 1 is a flowchart illustrating a method for forming a carbon nanotube pulp in accordance with various embodiments.

The present disclosure generally provides a polymer blend including at least two immiscible polymers and a carbon nanotube pulp comprising entangled carbon nanotubes characterized as having one or more of the following characteristics: (i) a diameter of between about 10-100 nm, or between about 12-90 nm, or between about 15-80 nm, or between about 17-60 nm, or between about 20-50 nm, or between about 25-30 nm (ii) a length of between about 0.1-10 mm, or between about 0.2-9 mm, or between about 0.3-8 mm, or between about 0.44-7 mm, or between about 5-6 mm (iii) a density of between about 0.3-1.9 g/cm$^3$, or between about 0.35-1.8 g/cm$^3$, or between about 0.5-1.7 g/cm$^3$, or between about 0.1-1 g/cm$^3$, or between about 0.3-1.1 g/cm$^3$, (iv) an aspect ratio of at least about 250,000, or at least about 350,000, or at least about 500,000, or at least about 600,000 (v) a strain to failure of between about 1.8-7%, or between about 2-6.5% or between about 3-5%, (vi) and a surface area from about 100-300 m$^2$/g, or from about 125-275 m$^2$/g, or from about 150-250 m$^2$/g or from about 175-225 m$^2$/g. In further embodiments, in addition to the characteristics above, the entangled carbon nanotubes may also be characterized as having a tensile strength of between about 0.2-3.2 GPa, or between about 0.3-3 GPa, or between about 0.3-2.8 GPa and/or a specific strength of between about 1800-2900 kN·M/kg, or between about 2000-2700 kN·M/kg or between about 2200-2600 kN·M/kg.

Surprisingly, it has been found that the particular carbon nanotube pulp comprising entangled carbon nanotubes according to the present disclosure can be effectively employed to compatibilize at least two immiscible polymers, including, but not limited to, polyethylene (PE) and polyester (PET) or polycarbonate (PC) and acrylonitrile butadiene styrene (ABS), and control their phase behavior in order to provide a synergistic effect in the improvement of various mechanical properties, such as tensile/compressive strength, fracture toughness, flexibility, and modulus.

The polymer blend described herein may find use in various applications including, but not limited to, high impact applications, conductive applications and flame retardant applications.

The following terms shall have the following meanings:

The term "comprising" and derivatives thereof are not intended to exclude the presence of any additional component, step or procedure, whether or not the same is disclosed herein. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article.

The phrases "in one embodiment", "according to one embodiment" and the like generally mean the particular feature, structure, or characteristic following the phrase is included in at least one aspect of the present disclosure, and may be included in more than one aspect of the present disclosure. Importantly, such phases do not necessarily refer to the same aspect.

If the specification states a component or feature "may", "can", "could", or "might" be included or have a characteristic, that particular component or feature is not required to be included or have the characteristic.

As used herein, the term "immiscible polymers" refers to at least two polymers that form a blend with limited solubility and non-zero interfacial tension, i.e. a blend having a free energy of mixing ($\Delta G_m$) which is greater than zero:

$$\Delta G_m \cong \Delta H_m > 0$$

Typically, when at least two polymers are different in structure, the enthalpy of mixing ($\Delta H_m$) is positive because the energies of interaction are high, thus the polymers resist interaction. Conversely, when polymers are similar in structure, the enthalpy of mixing is negative, thus the free energy of mixing is also negative, and the polymers will form a homogeneous mixture. Thus, "miscible polymers" are at least two polymers that form a blend having a free energy of mixing which is less than zero. The miscibility or immiscibility of a given blend of at least two polymers may also be determined using techniques well known in the art. For example, the blend of the at least two polymers may be melt-mixed and the presence or absence of phase separated domains in the blend can be determined using microscopy techniques, such as scanning or transmission electron microscopy (SEM or TEM, respectively). The glass transition temperature ($T_g$) of a blend of the at least two polymers can also be measured by Thermal Mechanical Analysis (TMA) and used as a guide to determine whether the at least two polymers are immiscible. In this case, if the polymer blend is found to have two $T_g$'s, then the polymers are likely to be immiscible. On the other hand, if only one $T_g$ for the polymer blend is observed, then the polymers are likely to be miscible.

As used herein, the term "substantially free" refers to a composition or blend in which a particular compound or moiety is present in an amount that has no material effect on the composition or blend. In some embodiments, "substantially free" may refer to a composition or blend in which the particular compound or moiety is present in the composition or blend in an amount of less than 2% by weight, or less than 1% by weight, or less than 0.5% by weight, or less than 0.1% by weight, or less than 0.05% by weight, or even less than 0.01% by weight, based on the total weight of the composition or blend, or that no amount of that particular compound or moiety is present in the respective composition or blend.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

According to one embodiment, the carbon nanotube pulp useful in the polymer blend includes entangled carbon nanotubes having the particular characteristics described above. Presently, there exist multiple processes and variations thereof for growing nanotubes and forming yarns, sheets or cable structures made from these nanotubes to act as a source carbon nanotube material for the pulp. These processes include: (1) Chemical Vapor Deposition (CVD), a process that can occur at near ambient or at high pressures, and at temperatures above about 400° C., (2) Arc Discharge, a high temperature process that can give rise to tubes having a high degree of perfection, and (3) Laser ablation.

In some embodiments, a CVD process or similar gas phase pyrolysis procedure known in the industry can be used to generate the appropriate nanotube material. Growth temperatures for a CVD process can be comparatively low ranging, for instance, from about 400° C. to about 1350° C. Carbon nanotubes, both single wall carbon nanotubes (SWNT) or multiwall carbon nanotubes (MWNT), may be grown, in some embodiments, by exposing nanoscaled catalyst particles in the presence of reagent carbon-containing gases (i.e. a gaseous carbon source). In particular, the nanoscaled catalyst particles may be introduced into the reagent carbon-containing gases, either by the addition of existing particles or by in situ synthesis of the particles from a metal-organic precursor, or even non-metallic catalysts. Although both SWNT and MWNT may be grown, in certain instances, SWNT may be selected due to their relatively higher growth rate and tendency to form rope-like structures which may offer advantages in handling, thermal conductivity, electronic properties and strength.

It should be noted that although reference is made throughout the application to nanotubes synthesized from carbon, other compound(s), such as boron nitride, MoS2, or a combination thereof may be used in the synthesis of nanotubes in connection with the present disclosure. For instance, it should be understood, that boron nitride nanotubes may also be grown, but with different chemical precursors. In addition, it should be noted that boron and/or nitrogen may also be used to reduce resistivity in individual carbon nanotubes. Furthermore, other methods, such as plasma CVD or the like can also be used to fabricate the nanotubes of the present invention.

In some embodiments, the carbon nanotube pulp can include, for example, carbon nanotube pulp formed as described with greater detail below with reference to FIG. 1. In general, the carbon nanotube pulp can be made from any nanotube material, such as a carbon nanotube sheet, carbon nanotube strip, carbon nanotube tape, bulk-collected carbon nanotubes, carbon nanotube yarn, any other suitable carbon nanotube material containing entangled carbon nanotubes or combinations thereof.

In some embodiments, the carbon nanotube material can be produced by a Floating Catalyst Chemical Vapor Deposition (FCCVD) method as described in U.S. Pat. No. 8,999,285, the contents of which are incorporated herein in their entirety. The FCCVD method of carbon nanotube production can lead to very long nanotubes (>100 microns) that become well entangled while in the gas phase as they are being created. As the carbon nanotube material exits the hot zone of the furnace, the nanotubes entangle, bundle and otherwise coalesce into an extended network of intercon-nected and branching bundles that is not obtainable by other carbon nanotube production processes. In some embodi-ments, the extended network of interconnected carbon nano-tubes produced by FCCVD is preserved through the pulping process, thus improving electrical and mechanical properties as compared to conventional carbon black and carbon nano-tube powder.

Figure 2:
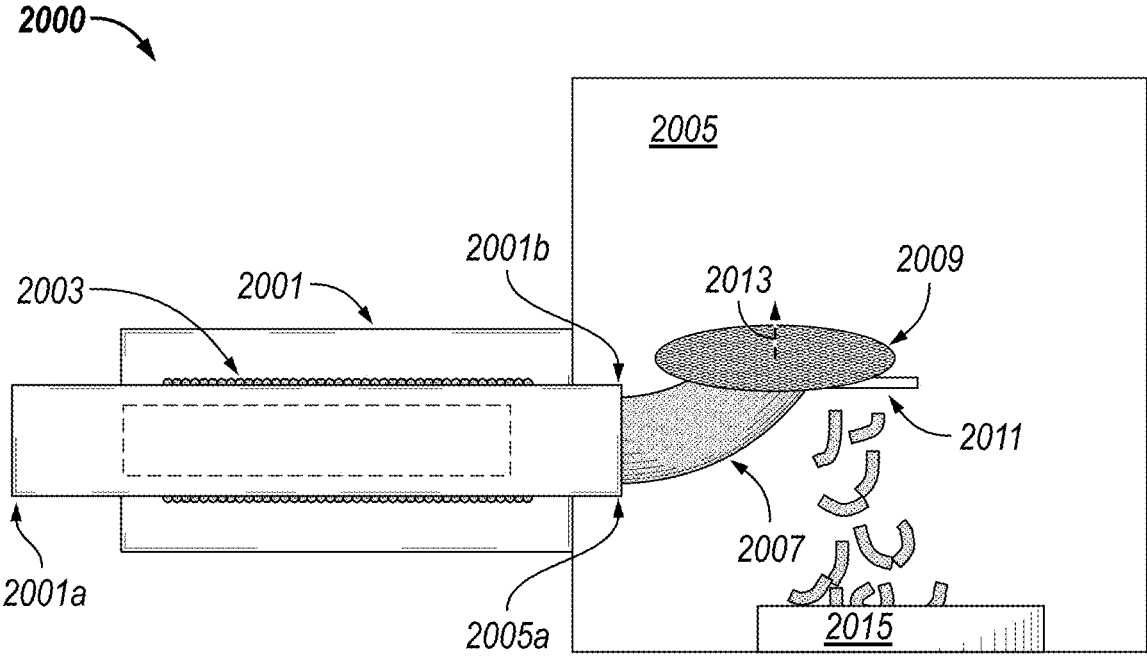
FIG. 2 is a diagram illustrating a system for direct collection of well-entangled networks of carbon nanotube material in accordance with various embodiments.

Referring now to FIG. 2, carbon nanotube material can be collected from the FCCVD reactor by a collection system 2000. The system 2000, in some embodiments, can be coupled to a synthesis chamber 2001. The synthesis chamber 2001, in general, includes an entrance end 2001a, into which reaction gases may be supplied, a hot zone 2002, where synthesis of extended length nanotubes may occur, and an exit end 2001b from which the products of the reaction, namely the extended length nanotubes and exhaust gases, may exit and be collected. In some embodiments, synthesis chamber 2001 may include a quartz tube 2003, extending through the hot zone 2002. Although illustrated generally in FIG. 2, it should be appreciated that other configurations may be employed in the design of synthesis chamber 2001.

The system 2000, in some embodiments, includes a housing 2005. The housing 2005, as illustrated in FIG. 2, may be substantially airtight to minimize the release of potentially hazardous airborne particulates from within the synthesis chamber 2001 into the environment, and to pre-vent oxygen from entering into the system 2000 and reach-ing the synthesis chamber 2001. In particular, the presence of oxygen within the synthesis chamber 2001 can affect the integrity and compromise the production of the nanotubes.

System 2000 may also include an inlet 2005a of the housing 2005 for engaging the exit end 2001b of the synthesis chamber 2001 in a substantially airtight manner. In some embodiments, as the carbon nanotubes exit the syn-thesis chamber 2001, the nanotubes entangle, bundle and otherwise coalesce into an extended network of intercon-nected and branching bundles. In some embodiments, these extended networks tend to form a hollow carbon nanotube "sock" similar in shape to a windsock inflated by a breeze. Thus, the carbon nanotubes can be collected within the housing 2005 from the synthesis chamber 2001 by drawing the carbon nanotube sock 2007 onto a rotating mesh disk 2009 (e.g., by vacuum suction on a back side of the disk 2009) and removing the carbon nanotubes from the rotating disk 2009 by a scalpel or "doctor" blade 2011, as shown in FIG. 2. In particular, as the carbon nanotube sock 2007 is drawn onto the rotating mesh disk 2009, it forms a film on the disk 2009, which the blade 2011 then scrapes off and severs as a new portion of the carbon nanotube sock 2007 is drawn onto the disk 2009. The carbon nanotubes can then fall into or otherwise be transported to a collection bin 2015 or other collection receptacle for subsequent pulping.

In some embodiments, the vacuum suction can be pro-vided as a portion of at least one gas exhaust 2013 through which gases and heat may leave the housing 2005. Gas exiting from exhaust 2013, in an embodiment, may be allowed to pass through a liquid, such as water, or a filter to collect nanotubes not gathered upstream of the exhaust 2007. In addition, the exhaust gas may be treated with a flame in order to de-energize various components of the exhaust gas, for instance, reactive hydrogen may be oxidized to form water.

Although described above with reference to a collection system 2000 having a rotating disk 2009 collection mecha-nism, it will be apparent in view of this disclosure that, in some embodiments, any technique for collecting and remov-ing the carbon nanotubes from the FCCVD environment without destroying their well entanglement can be used in accordance with various embodiments. For example, col-lection of the carbon nanotubes produced by FCCVD, in some embodiments, can be performed by formation of carbon nanotube yarns or tows (e.g., by twisting collected carbon nanotubes together) and/or carbon nanotube sheets as described in U.S. Pat. Nos. 7,993,620 and 8,722,171, the contents of each of which are incorporated herein in their entirety.

In some embodiments, the carbon nanotubes can initially include iron or other inclusions. In other embodiments, such inclusions are unwanted and can be removed, preferably prior to pulping. For example, iron inclusions, in some embodiments, can be expunged from the carbon nanotubes by heating the nanotubes to a high temperature (e.g., about 1800° C.) in an inert or reducing atmosphere. At such temperatures the iron can be distilled out of the carbon nanotubes and re-solidified on a cooler surface. In some embodiments, such removal of inclusions can be performed, for example, in a CVD reactor such as an FCCVD reactor described above, or any CVD reactor described, for example, in U.S. Pat. Nos. 8,999,285 and 7,993,620, the contents of each of which are incorporated herein in their entirety.

In some embodiments, inclusions such as, for example iron inclusions, can be removed by heating the carbon nanotube material to about 500° C. in air and then treated with an acid. In some embodiments, for example, the carbon nanotube material can be heated at 500° C. in air for about two hours and then treated with muriatic acid to remove iron inclusions.

Accordingly, in some embodiments, the carbon nanotube pulp is formed from any one of a carbon nanotube sheet, carbon nanotube strip, carbon nanotube tape, bulk-collected carbon nanotubes, carbon nanotube yarn or any carbon nanotube material containing well-entangled carbon nano-tubes or combinations thereof.

Referring now to FIG. 1, a method 1100 is provided for forming a carbon nanotube pulp in accordance with various embodiments. The method 1100 includes a step of pulping 1101 by a pulping machine, one or more of a carbon nanotube sheet, a carbon nanotube strip, a carbon nanotube tape, bulk-collected carbon nanotubes, a carbon nanotube yarn or any other carbon nanotube material containing well-entangled carbon nanotubes, or combinations thereof to form the carbon nanotube pulp. The method also includes a step of grinding 1103 in a first grinder, at least a portion of the carbon nanotube pulp. The method may also include a step of disaggregating 1105, in a second grinder, the carbon nanotube pulp.

The step of pulping 1101, in accordance with various embodiments, can be performed by placing a carbon nanotube sheet, carbon nanotube strip, carbon nanotube tape, carbon nanotube yarn or directly collected carbon nanotubes into a pulping machine and pulping the material to form the carbon nanotube pulp. The pulping machine, in accordance with various embodiments, can include, for example, a Hollander beater, a conical refiner, a stamp mill, or any other suitable mechanical pulping device or combinations thereof.

In accordance with various embodiments, the carbon nanotube pulp can be tested to confirm pulp particle size and a user can then determine whether or not to continue pulping. In some embodiments, the carbon nanotube pulp can be prepared for grinding (e.g., as in the step of grinding 1103) by dewatering the carbon nanotube pulp to form, for example, a carbon nanotube press cake.

The carbon nanotube pulp, in some embodiments, can then be dried for further processing. Drying can be performed, for example, by air drying, oven drying, vacuum oven drying, or by any other suitable drying process. In some embodiments, the carbon nanotube pulp can be dried in an oven at a temperature from about 90° C. to about 110° C. for about 4 hours to about 12 hours.

The step of grinding 1103, in accordance with various embodiments, can be performed by using a grinder to break up the carbon nanotube pulp into carbon nanotube pulp particles. In some embodiments, a particle size of the carbon nanotube pulp is unchanged by the grinder, which breaks up larger chunks of carbon nanotube pulp into constituent carbon nanotube pulp particles for subsequent drying. In some embodiments the grinder can include, for example, a coffee grinder, an industrial burr mill, combinations thereof or any other suitable grinding device.

In some embodiments, the carbon nanotubes are non-functionalized. In another embodiment, the carbon nanotubes within the carbon nanotube pulp can be physically (for e.g. ultrasonicated or coated) or chemically modified (for e.g. with an acid, solvent, polymer or an oxidizer). Such modifications can involve the carbon nanotube ends, sidewalls, or both. Physical and chemical modifications may include, but are not limited to covalent bonding, ionic bonding, chemisorption, intercalation, surfactant interactions, polymer wrapping, cutting, solvation, and combinations thereof which results in the addition of functional groups to the carbon nanotubes, including, but not limited to, —COOH, —PO$_4^-$, —SO$_3^-$, —SO$_3$H, —SH, —NH$_2$, tertiary amines, quaternized amines, —CHO and/or —OH. In one embodiment, chemical modifications can include, for example, modifying with polysilazanes, polyureasilazane, conductive polymers, polyamine, polythiophene, infiltration with polyamides, chemical modification to introduce carboxylate or amine functionalities, any modification suitable for enhancing ionic conductivity or combinations thereof. In another particular embodiment, the functionalized carbon nanotube is one that includes an organic and/or inorganic compound attached to its surface with non-limiting examples of such organic compounds including at least one chemical group chosen from: carboxyl, amine, polyamide, polyamphiphiles, diazonium salts, pyrenyl, silane and combination thereof and non-limiting examples of the inorganic compounds including at least one fluorine compound of boron, titanium, niobium, tungsten, and combination thereof. The inorganic compounds as well as the organic compounds may also comprise a halogen atom or halogenated compound. In some embodiments, the carbon nanotubes are functionalized with from about 5%-100% of the sites available for functionalization or from about 10%-90% or from about 25%-75% or from about 50%-75% or from about 50%-100% of the sites available for functionalization. In some embodiments, the physical modification, chemical modification and/or coating can be performed after the step of grinding 1103 but before the step of disaggregating 1105. However, it will be apparent in view of this disclosure that the physical modification, chemical modification and/or coating can be performed at any time including, for example, prior to pulping 1101, after pulping 1101 but before grinding 1103, after grinding 1103 but before disaggregation 1105, after disaggregation 1105, or combinations thereof. It will further be apparent in view of this disclosure that, in some embodiments, the physical modification, chemical modification and/or coating can be performed in stages at different points throughout the pulping process and/or that multiple modifications and/or coatings can be applied.

The step of disaggregating 1105, in a second grinder, the carbon nanotube pulp can be performed by adding the dried carbon nanotube pulp to the second grinder (e.g., a coffee grinder, an industrial burr mill, combinations thereof, or any other suitable grinding device). The step of disaggregating 1105, in some embodiments, also includes grinding the dried carbon nanotube pulp to break up any remaining clumps or agglomerates, thereby increasing a volume of the carbon nanotube pulp to form the carbon nanotube pulp. In some embodiments, the step of disaggregating 1105 can produce a carbon nanotube pulp having about 5 to about 15 times the volume of the ground carbon nanotube pulp produced in the step of grinding 1103 (i.e., the ground carbon nanotube pulp is about 5 times to about 15 times more dense than the disaggregated carbon nanotube pulp). The step of disaggregating 1105 the carbon nanotube pulp advantageously provides greater surface area and better dispersion of the carbon nanotube pulp. By reducing or eliminating agglomerations, the dispersion of the carbon nanotube pulp is improved and the risk of clumping during formation of the carbon nanotube pulp network is reduced. By contrast, if the carbon nanotube pulp is not well dispersed, the nanotubes will clump, and more material will be required to interconnect the active material particles, thereby reducing the amount of active material and thus reducing the performance of the structure.

Thus, according to one embodiment, the carbon nanotube pulp includes entangled carbon nanotubes created by a FCCVD process using system 2000 shown in FIG. 2 which are characterized as having one or more of the following characteristics: (i) a diameter of between about 2-20 nm or between about 6-15 nm or between about 7-10 nm, (ii) a length of between about 1-10 mm or between about 2-8 mm or between about 3-6 mm, (iii) a density of between about 0.7-9 g/cm$^3$ or between about 0.8-7 g/cm$^3$ or between about 0.9-5 g/cm$^3$, (iv) an aspect ratio of at least about 250,000, or at least about 500,000 or at least about 750,000 or at least about 1,000,000 and (v) a surface area between about 100-300 m$^2$/g or between about 150-250 m$^2$/g or between about 175-200 m$^2$/g.

According to one embodiment, the polymer blend includes at least about 0.001% by weight, based on the total weight of the immiscible polymers, of the carbon nanotube pulp. In still other embodiments, the polymer blend includes at least about 0.5% by weight, or at least about 1% by weight or at least about 1.5% by weight or at least about 2% by weight, or at least about 2.5% by weight, or at least about 3% by weight, or at least about 4% by weight, or at least about 5% by weight, based on the total weight of the immiscible polymers, of the carbon nanotube pulp.

According to another embodiment, the polymer blend includes less than about 15% by weight, based on the total weight of the immiscible polymers, of the carbon nanotube pulp. In still other embodiments, the polymer blend includes less than about 10% by weight, or less than about 7.5% by weight or at less than about 6% by weight or less than about 5% by weight, or less than about 4.5% by weight, or less than about 4% by weight, or less than about 3.5% by weight, or at less than about 3.25% by weight, based on the total weight of the immiscible polymers, of the carbon nanotube pulp.

In still another embodiment, the polymer blend includes about 0.001% by weight to about 20% by weight, based on the total weight of the immiscible polymers, of the carbon nanotube pulp. In yet another embodiment, the polymer blend includes about 0.1% by weight to about 10% by weight, or about 0.25% by weight to about 7% by weight or about 0.5% by weight to about 5% by weight, or about 0.75% by weight to about 3% by weight, based on the total weight of the immiscible polymers, of the carbon nanotube pulp.

The polymer blend of the present disclosure also includes at least two immiscible polymers. Given the diverse array of polymers that may be used in accordance with the present disclosure, it will be appreciated that it would be impractical to provide a comprehensive list of immiscible polymer combinations that may be used. Nevertheless, having regard to the general guidelines set forth above for determining whether a combination of polymers are immiscible, suitable polymers in general can be broadly classified as thermoplastic polymers. Suitable polymers can also exhibit a limited degree of cross-linking.

Examples of suitable polymers include, but are not limited to, polyethylene such as low density polyethylene, high density polyethylene, medium density polyethylene and linear low density polyethylene, polypropylene, polystyrene, polyacrylic acid and copolymers of polyacrylic acid and polystyrene, polyurethane, polyvinylchloride, polyvinylflouride, acrylonitrile-butadiene-styrene terpolymers, styrene-acrylonitrile copolymers, styrene butadiene copolymers, poly(4-methyl-pentene-1), polybutylene, polyvinylidene chloride, polyvinyl butyral, polyvinyl imidazole, chlorinated polyethylene, polyethylene oxide, ethylene-vinyl acetate copolymers, polyvinyl acetate, polyvinyl alcohol, polymethyl-methacrylate, polymethyl-acrylate, ethylene acrylic acid copolymers, ethylene-acrylic acid metal salt copolymers, chlorosulphonate polyolefins, polyesters such as polyethylene teraphthalate and polybutylene teraphthalate, polyamides such as Nylon 6, Nylon 11, Nylon 13, Nylon 66, polycarbonates, polysulfones, polyarylene and polyalkylene oxides; agrose, cellulose, gelatin, alginate, elastin, chitosan, poly(lactides), poly(glycolides), poly(lactide-coglycolides), poly(lactic acids), poly(glycolic acids). poly(lactic acid-co-glycolic acids), polycaprolactone, polyesteramides, polyanhydrides, poly(amino acids), polyorthoesters, poly(hydroxyalkanoates), polyacetyls, polycyanoacrylates, polyetheresters, poly(dioxanones), poly(alkylene alkylates), copolymers of polyethylene glycol and polyorthoester, poly(hydroxy acids), poly(lactones), poly (amides), poly(ester-amides), poly(amino acids), poly(anhydrides), poly(ortho-esters), poly(phosphazines), poly(thioesters), polysaccharides and mixtures, blends and copolymers thereof.

According to one particular embodiment, the polymer blend can include the following combinations of immiscible polymers: polyethylene and polyester, polystyrene and polyethylene, maleic anhydride grafted polystyrene and polyethylene, ethylene vinyl acetate and polyvinyl chloride, maleic anhydride grafted polyvinyl chloride and ethylene vinyl acetate, polyvinyl chloride and polycarbonate, polyvinyl chloride and polymethyl methacrylate, polymethyl methacrylate and polyvinyl chloride, styrene acrylonitrile and polycarbonate, polycarbonate and polycaprolactam, polycarbonate and polypropylene, polycarbonate and polyethylene, ethylene vinyl acetate and polypropylene, polyethylene and polypropylene, polyethylene and polystyrene, acrylonitrile butadiene styrene copolymer and polyvinylchloride, polyethylene and polyvinylchloride and polystyrene and polyvinylchloride.

In the above blends, the first immiscible polymer may be present in an amount of about 1%-99% by weight while the second immiscible polymer may present in an amount of about 99%-1% by weight, based on the total weight of the immiscible polymers. In another embodiment in the above blends, the first immiscible polymer may be present in an amount of about 10%-90% by weight or about 20%-80% by weight or about 30%-70% by weight or about 40-60% by weight or about 45%-55% by weight while the second immiscible polymer may be present in an amount of about 90%-10% by weight or about 80%-20% by weight or about 70%-30% by weight or about 60-40% by weight or about 55%-45% by weight, based on the total weight of the immiscible polymers. It will be appreciated that one or more other immiscible polymers may be added to the blends above to form a polymer blend including three or more immiscible polymers.

In some embodiments, the total amount of immiscible polymers in the polymer blend may range from about 5% by weight to about 99.9% by weight, based on the total weight of the polymer blend. In other embodiments, the amount of immiscible polymers in the polymer blend may range from about 50% by weight to about 98% by weight, or about 70% by weight to about 95% by weight, based on the total weight of the polymer blend.

In yet another embodiment, the polymer blend may further include one or more additives including, but not limited to, a surfactant (e.g. cationic surfactant, anionic surfactant, zwitterionic surfactant, non-ionic surfactant and combinations thereof), an electrically conductive filler (e.g. carbon black, carbon fiber, metal filler, conductive non-metal fillers, metal coated fillers and combinations thereof), an impact modifier (e.g. core-shell type graft copolymers and ionomer resins), a conventional compatibilizing agent (e.g. the compatibilizing agents described in U.S. Pat. No. 7,022,776 at col. 10, line 66 to col. 14, line 13, the contents of which are hereby incorporated by reference), antioxidant, nucleating agent, coupling agent, UV absorber, UV stabilizer, pigment, dye, reinforcing filler, slip agent, plasticizer, processing aid, lubricant, viscosity control agent, tackifier, anti-blocking agent, extender oil, metal deactivator, voltage stabilizer, flame retardant filler, booster, catalyst, smoke suppressant, mold release agent, non-conductive filler and mixtures thereof. When present, the amount of such additives may range from about 0.1% by weight to about 40% by weight, based on the total weight of the polymer blend. According to one particular embodiment, the polymer blend is substantially free of the conventional compatibilizing agents described above (i.e. the carbon nanotube pulp of the present disclosure is the only compatibilizing agent present in the polymer blend).

According to another embodiment, the present disclosure generally provides a method for producing the polymer blend by melt blending the immiscible polymers and carbon nanotube pulp. In one embodiment, the method may include dispersing a first portion of the carbon nanotube pulp into the first immiscible polymer to form a first blend, dispersing a second portion of the carbon nanotube pulp into the second immiscible polymer to form a second bend and mixing the first blend and second blend to form the polymer blend. In an alternative embodiment, the polymer blend may be formed by combining the at least two immiscible polymers to form a mixture and dispersing the carbon nanotube pulp into the mixture to form the polymer blend.

In one particular embodiment, the first immiscible polymer may be blended with a first portion of the carbon nanotube pulp and fed into the feed throat of an extruder; the second immiscible polymer and a second portion of the carbon nanotube pulp may then be added into the extruder further downstream through a side feeder. In still another embodiment, the first immiscible polymer and second immiscible polymer may be fed along with the carbon nanotube pulp simultaneously through the feed throat of the extruder.

It is generally preferred to use a twin, co-rotating, screw extruder to feed the first immiscible polymer and first portion of the carbon nanotube pulp and second immiscible polymer and second portion of the carbon nanotube pulp sequentially into the extruder, with the first immiscible polymer and first portion of the carbon nanotube pulp being fed into the feed throat and the second immiscible polymer

12 blending equipment may be used, including roll mills, Helicones, Buss kneaders, dough mixers, and the like.

The components of the polymer blend can be selected to provide articles that are suitable for a variety of applications. Representative examples include, but are not limited to, adhesives, applications in the automotive industry such as automotive body moldings, applications in the construction industry such as structural components (e.g. sized lumber, shaped trim, posts, beams and shaped structural members), lightweight ceramics such as pre-cast and cast-in-place construction materials (e.g. cementitious and gypsum materials such as blocks, boards, panels, roof decks and flooring), landfill covers, odor barriers, dust covers and applications in the electronic and computer industry such as current collectors for high power electrochemical capacitors and batteries, bipolar plates for PEM fuel cells as well as bifunctional (binder and conductivity enhancers) additives to a lithium battery cathode.

EXAMPLES

Carbon nanotube pulp according to the present disclosure was compounded separately into polyester and liner low density polyethylene (LLDPE) resins. Masterbatches of 3% by weight and 5% by weight of the carbon nanotube pulp in postconsumer polyester (PET) supplied by Unifi and LLDPE, supplied by Entec, were made by premixing resin pellets with the carbon nanotube pulp in 500-700 g batches. The blend was then extruded on a ThermoFischer Pharma 11 twin screw extruder at the conditions below in Table 1. Control samples of neat PET/LLDPE samples were also made at the same PET/LLDPE ratios.

TABLE 1

| Blend Ratio PET/LLDPE (wt %) | % by weight CNT pulp | Die | Zone 6 | Zone 5 | Zone 4 | Zone 3 | Zone 2 | Zone 1 | Feeder | Feed rate | Screw Speed (RPM) |
|---|---|---|---|---|---|---|---|---|---|---|---|
| 50/50 | 0 | 220 | 220 | 245 | 265 | 265 | 265 | 265 | 245 | 30 | 525 |
| 90/10 | 0 | 270 | 270 | 280 | 295 | 295 | 285 | 275 | 205 | 30 | 525 |
| 100/0 | 3 | 270 | 285 | 285 | 285 | 285 | 285 | 260 | 240 | 30 | 525 |
| 0/100 | 5 | 235 | 205 | 210 | 210 | 210 | 210 | 200 | 190 | 25 | 400 |
| 50/50 | 3 | 250 | 265 | 265 | 265 | 265 | 265 | 250 | 230 | 30 | 525 |
| 90/10 | 3 | 260 | 275 | 275 | 275 | 275 | 275 | 260 | 240 | 30 | 525 | and second portion of the carbon nanotube pulp being fed further downstream through a side feeder. The temperature of the extruder may generally be raised to any temperature above the melting point of the first immiscible polymer and the second immiscible polymer. The composition emerging from the extruder may be quenched under water and pelletized for use in other finishing or forming operations.

While it is generally desirable to use an extruder to melt blend the various components listed above, other melt The blends were injection molded on a Sumitomo SE75S single screw injection molding machine. Additional masterbatches and blends were then compounded. First, pellets and carbon nanotube pulp were mixed to give a loading of 3% by weight carbon nanotube pulp in both PET and LLDPE using a Brabender Technologies v-hopper Model No.: F 18-0 VOL and then compounded on a 18-mm twin screw extruder (Leistritz, model: ZSK-8HP-400) with a length-to diameter ratio (L/D) of 40:1.

TABLE 2

| Blend Ratio PET/LLDPE (wt %) | % by weight CNT pulp | Zone 7 | Zone 6 | Zone 5 | Zone 4 | Zone 3 | Zone 2 | Zone 1 | Screw Speed (RPM) |
|---|---|---|---|---|---|---|---|---|---|
| 100/0 | 3 | 285 | 285 | 285 | 285 | 280 | 280 | 275 | 300 |
| 0/100 | 3 | 185 | 185 | 190 | 185 | 175 | 170 | 150 | 251 |

TABLE 2-continued

| Blend Ratio PET/LLDPE (wt %) | % by weight CNT pulp | Zone 7 | Zone 6 | Zone 5 | Zone 4 | Zone 3 | Zone 2 | Zone 1 | Screw Speed (RPM) |
|---|---|---|---|---|---|---|---|---|---|
| 80/20 | 3 | 265 | 265 | 265 | 265 | 260 | 260 | 255 | 151 |
| 80/20 | 1 | 265 | 265 | 265 | 265 | 260 | 260 | 255 | 151 |

The 80/20 blends were then injection molded on a Battenfeld injection molder (EcoPower 55/130 Unilog B6, 134043-100).

Figure 3:
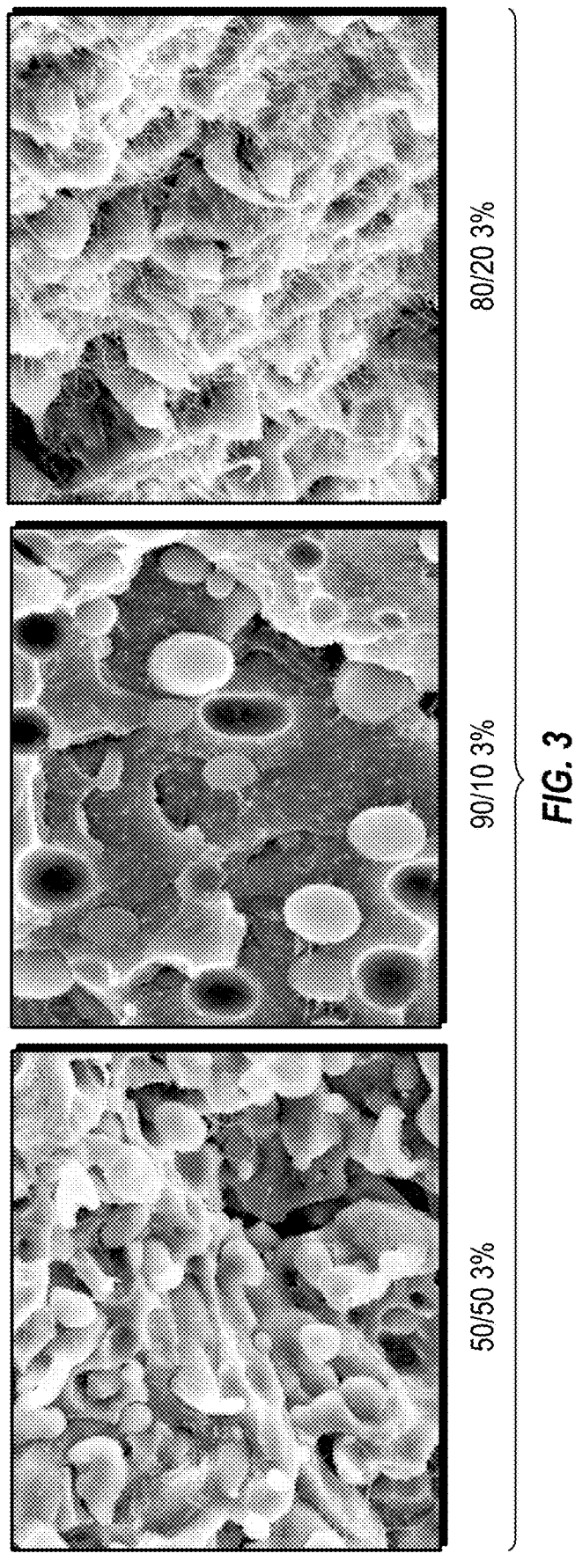
FIG. 3 illustrates scanning electron microscope photos of polymer blends containing PET/LLDPE and the carbon nanotube pulp according to the present disclosure.
Figure 4:
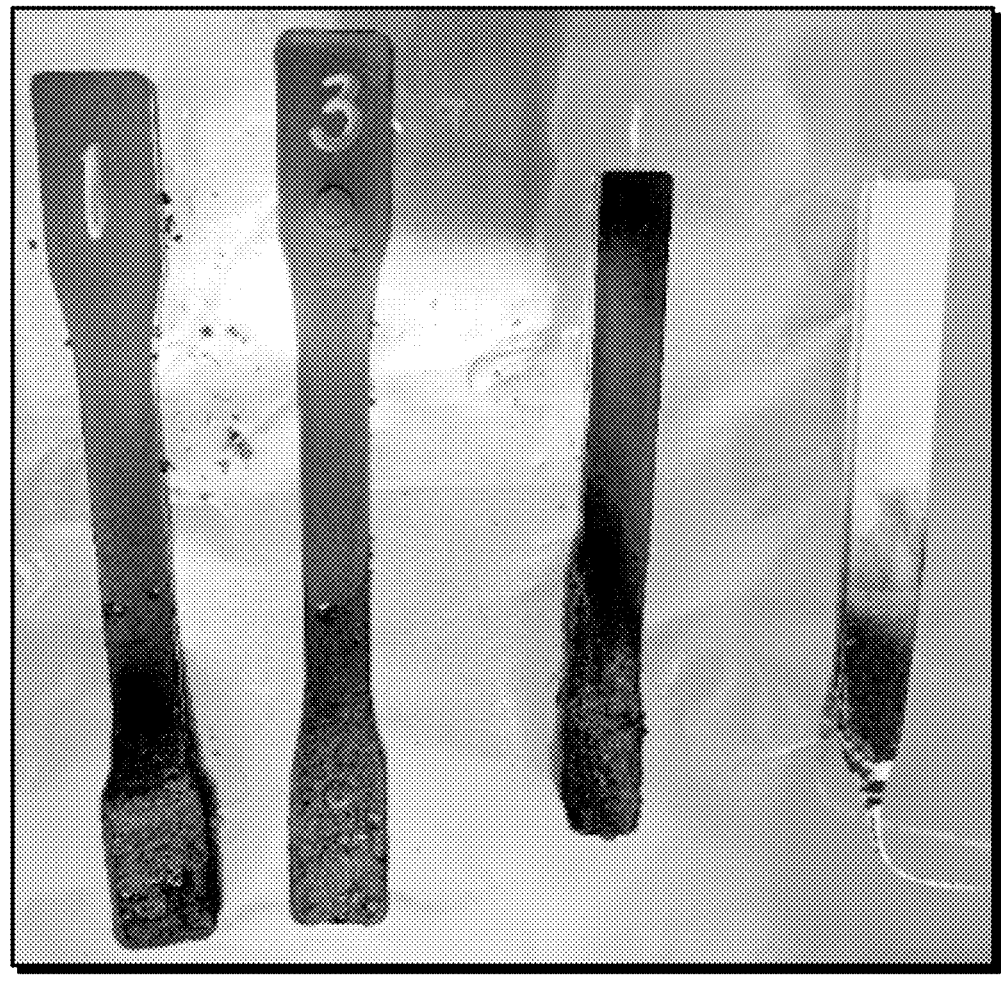
FIG. 4 illustrates injection molded samples of polymer blends containing PET/LLDPE and carbon nanotube pulp according to the present disclosure after a fire/drip test. From right to left, the samples shown include 80 wt % PET/20 wt % LLDPE plus 1% by weight carbon nanotube pulp, 80 wt % PET/20 wt % LLDPE plus 3% by weight carbon nanotube pulp, 90 wt % PET/10 wt % LLDPE plus 3% by weight carbon nanotube pulp and a 90 wt % PET/10 wt % LLDPE control.

SEM Imaging:

The SEM photos shown in FIG. 3 demonstrate that the carbon nanotube pulp traversed the boundaries between the two phases suggesting a mechanism of compatibilization or at the very least an anchor between the phases which may lead to improvement in the interfacial interaction and mechanical properties.

Mechanical Testing:

The results from the injection molding trials are shown below in Tables 3 and 4:

TABLE 3

| Formulation PET/LLDPE (wt %) | | Tensile Strength (MPA) ASTM D-412/638 | Tear Strength (PLI) ASTM D-624 |
|---|---|---|---|
| | ASTM Method | | |
| 50/50 Control | Average | 22.5 | 400 |
| | Std. Deviation | 1.32 | |
| 50/50 with 3% by weight CNT pulp | Average | 31.0 | 300 |
| | Std. Deviation | 0.57 | |
| 90/10 Control | Average | 53.8 | 1630 |
| | Std. Deviation | 0.35 | |
| 90/10 with 3% by weight CNT pulp | Average | 71.3 | 500 |
| | Std. Deviation | 0.96 | |

TABLE 4

| Formulation PET/LLDPE (wt %) | | Modulus (MPA) | Tensile Stress at Break (MPA) | Tensile Strain at Break (MPA) | Rate (mm/min) |
|---|---|---|---|---|---|
| 80/20 with 1% by weight CNT pulp | Average | 1585.7 | 41.7 | 0.053 | 5 |
| | Std. Deviation | 16.7 | 0.7 | 0003 | |
| 80/20 with 3% by weight CNT pulp | Average | 2213.3 | 35.0 | 0.020 | 5 |
| | Std. Deviation | 59.3 | 5.3 | 0.004 | |

Dog bones were then made for a direct comparison of tensile strength and the results can be found in Table 5. The samples were pulled at 20 in/min with a 450 lb load cell.

TABLE 5

| Formulation PET/LLDPE (wt %) | | Tensile Stress at Break (MPA) |
|---|---|---|
| 80/20 with 1% by weight CNT pulp | Average | 53.1 |
| | Std. Deviation | 7.0 |

TABLE 5-continued

| Formulation PET/LLDPE (wt %) | | Tensile Stress at Break (MPA) |
|---|---|---|
| 80/20 with 3% by weight CNT pulp | Average | 37.1 |
| | Std. Deviation | 2.9 |

Modulus was then tested using a strain rate of 5 mm/min with a 20 lb load cell. The results are shown in Table 6 below. The moduli of standard building materials were added for reference.

TABLE 6

| Panel | Modulus (GPA) |
|---|---|
| Hardboard | 3.1-5.5 |
| Medium Density Fiberboard (MDF) | 3.6 |
| Particle Board | 2.8-4.1 |
| Oriented Strand Board (OSB) | 4.4-6.3 |
| Plywood | 7-8.6 |
| PET/LLDPE 80/20 with 1% by weight CNT pulp | 1.6 |
| PET/LLDPE 80/20 with 3% by weight CNT pulp | 2.2 |
| 90/10 PET/LLDPE with 3% by weight CNT pulp | 1.1 |
| 90/10 PET/LLDPE Control | 0.81 |
| 50/50 PET/LLDPE with 3% by weight CNT pulp | 0.46 |
| 50/50 PET/LLDPE Control | 0.34 |

Modulus is one of the key properties that needs to be optimized in building materials. Building materials have to have enough stiffness so that they do not deform under stress but are not so stiff that they become brittle and break under low stress. The 80 wt % PET/20 wt % LLDPE blend with 3% by weight carbon nanotube pulp exhibited a modulus that approaches the modulus of widely used building materials.

TMA Testing:

TMA testing was performed, and the results are shown below in Table 7:

TABLE 7

|  | PET/LLDPE 50/50 Control | PET/LLDPE 50/50 with 3% by weight CNT pulp | PET/LLDPE 90/10 Control | PET/LLDPE 90/10 with 3% by weight CNT pulp |
|---|---|---|---|---|
| TMA Onset 1, ° C. | 117° C. | N/A | 100° C. | N/A |
| TMA Peak 1, ° C. | 121° C. | N/A | 112° C. | N/A |
| TMA Endset 1, ° C. | 124° C. | N/A | 118° C. | N/A |
| TMA Onset 2, ° C. | 240° C. | 243° C. | 245° C. | 244° C. |
| TMA Peak 2, ° C. | 245° C. | 249° C. | 247° C. | 248° C. |
| TMA Endset 2, ° C. | 248° C. | 257° C. | 249° C. | 250° C. |

Fire Testing:

Injection molded samples were subjected to a fire test to determine if they would drip molten polymer. During this test, the samples were secured onto a ring stand with a 3-prong clamp then exposed to a flame from a propane torch. The control samples immediately ignited and began to drip like candle wax. Samples with carbon nanotube pulp ignited after a few seconds when exposed to the flame but maintained their shape and did not drip (see FIG. 3). The 80 wt % PET/20 wt % LLDPE sample with 3% by weight carbon nanotube pulp was found to self-extinguish.

From the results above, the carbon nanotube pulp according to the present disclosure was shown to increase performance of immiscible polymeric blends that would otherwise be unusable. Tensile strength was increased by about 25-27% and the carbon nanotube pulp imparted fire-retardant properties that can only be obtained with large additions of halogenated compounds.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A polymer blend comprising at least two immiscible polymers and a carbon nanotube pulp comprising entangled carbon nanotubes characterized as having two or more of the following characteristics: (i) a diameter of between about 10-100 nm, (ii) a length of between about 0.1-10 mm, (iii) a density of between about 0.3-1.9 g/cm$^3$, (iv) an aspect ratio of at least about 250,000, (v) a strain to failure of between about 1.8-7%, and (vi) a surface area from about 100-300 m$^2$/g, wherein a first immiscible polymer and a second immiscible polymer are selected from: polyethylene and polyester, polystyrene and polyethylene, maleic anhydride grafted polystyrene and polyethylene, ethylene vinyl acetate and polyvinyl chloride, maleic anhydride grafted polyvinyl chloride and ethylene vinyl acetate, polyvinyl chloride and polycarbonate, polyvinyl chloride and polymethyl methacrylate, polymethyl methacrylate and polyvinyl chloride, styrene acrylonitrile and polycarbonate, polycarbonate and polycaprolactam, polycarbonate and polypropylene, polycarbonate and polyethylene, ethylene vinyl acetate and polypropylene, polyethylene and polypropylene, polyethylene and polystyrene, acrylonitrile butadiene styrene copolymer and polyvinylchloride, polyethylene and polyvinylchloride and polystyrene and polyvinylchloride.

2. The polymer blend of claim 1, wherein the carbon nanotubes are non-functionalized.

3. The polymer blend of claim 1, wherein the carbon nanotubes are functionalized.

4. The polymer blend of claim 1, wherein the carbon nanotube pulp is present in an amount of between about 0.001% by weight to about 20% by weight, based on the total weight of the immiscible polymers.

5. The polymer blend of claim 4, wherein the carbon nanotube pulp is present in an amount of between about 0.5% by weight to about 5% by weight, based on the total weight of the immiscible polymers.

6. The polymer blend of claim 1, wherein the first immiscible polymer is present in an amount of about 10%-90% by weight and the second immiscible polymer is present in an amount of about 90%-10% by weight, based on the total weight of the immiscible polymers.

7. The polymer blend of claim 1, wherein a total amount of immiscible polymers present in the polymer blend is between about 5% by weight to about 99.9% by weight, based on the total weight of the polymer blend.

8. The polymer blend of claim 1, further comprising at least one of a surfactant, an electrically conductive filler, an impact modifier, antioxidant, nucleating agent, coupling agent, UV absorber, UV stabilizer, pigment, dye, reinforcing filler, slip agent, plasticizer, processing aid, lubricant, viscosity control agent, tackifier, anti-blocking agent, extender oil, metal deactivator, voltage stabilizer, flame retardant filler, booster, catalyst, smoke suppressant, mold release agent and non-conductive filler.

9. A polymer blend of claim 1 for use in flame retardant applications, high impact applications and conducting applications.

10. A pellet comprising the polymer blend of claim 1.

11. An article comprising the polymer blend of claim 1.

* * * * *